(12) United States Patent
Shinozaki et al.

(10) Patent No.: US 11,225,063 B2
(45) Date of Patent: Jan. 18, 2022

(54) DECORATIVE MATERIAL

(71) Applicant: SEIREN CO., LTD., Fukui (JP)

(72) Inventors: Michio Shinozaki, Fukui (JP); Mitsugu Kinoshita, Fukui (JP)

(73) Assignee: SEIREN CO., LTD.

( * ) Notice: Subject to any disclaimer, the term of this patent is extended or adjusted under 35 U.S.C. 154(b) by 0 days.

(21) Appl. No.: 16/624,634

(22) PCT Filed: Jun. 21, 2018

(86) PCT No.: PCT/JP2018/023710
§ 371 (c)(1),
(2) Date: Dec. 19, 2019

(87) PCT Pub. No.: WO2019/004063
PCT Pub. Date: Jan. 3, 2019

(65) Prior Publication Data
US 2020/0130337 A1    Apr. 30, 2020

(30) Foreign Application Priority Data
Jun. 27, 2017 (JP) .............................. JP2017-124849

(51) Int. Cl.
B32B 27/20 (2006.01)
B32B 27/06 (2006.01)
(Continued)

(52) U.S. Cl.
CPC ............... B32B 27/20 (2013.01); B32B 7/02 (2013.01); B32B 19/045 (2013.01); B32B 27/06 (2013.01);
(Continued)

(58) Field of Classification Search
CPC ......... B32B 27/20; B32B 27/06; B32B 27/40; B32B 19/045; B32B 7/02
(Continued)

(56) References Cited

U.S. PATENT DOCUMENTS

| 5,352,649 A * | 10/1994 | Shibahashi | A61K 8/02 101/491 |
| 2009/0054534 A1* | 2/2009 | Kitamura | C09C 1/0018 514/769 |
| 2009/0162696 A1 | 6/2009 | Kitamura et al. | |

FOREIGN PATENT DOCUMENTS

| EP | 0388931 A2 * | 9/1990 | ............ B05D 5/066 |
| JP | H08192502 A | 7/1996 | |

(Continued)

OTHER PUBLICATIONS

Machine_English_translation_JP_2013023646_A1; Kadoue, Yuichi; Glitter Natural Leather; Feb. 4, 2013; EPO; whole document (Year: 2013).*

(Continued)

*Primary Examiner* — Tahseen Khan
(74) *Attorney, Agent, or Firm* — Lerner, David, Littenberg, Krumholz & Mentlik, LLP

(57) ABSTRACT

A decorative material includes a base material, a first cover layer, and a second cover layer. The first cover layer is laminated on the base material and covers the base material. The first cover layer is made of opaque synthesis resin. The second cover layer is laminated on the first cover layer and covers the first cover layer. The second cover layer is made of chromatic and transparent synthesis resin. The first cover layer contains first coloring pigment and bright pigment. The first coloring pigment has no luster. The bright pigment has luster. The second cover layer contains second coloring pigment. The second coloring pigment has no luster.

6 Claims, 3 Drawing Sheets

(51) Int. Cl.
*B32B 27/40* (2006.01)
*B32B 19/04* (2006.01)
*B32B 7/02* (2019.01)

(52) U.S. Cl.
CPC .......... *B32B 27/40* (2013.01); *B32B 2250/04* (2013.01); *B32B 2305/18* (2013.01); *B32B 2307/402* (2013.01); *B32B 2307/41* (2013.01); *B32B 2307/412* (2013.01); *B32B 2451/00* (2013.01)

(58) Field of Classification Search
USPC .......................................................... 428/160
See application file for complete search history.

(56) References Cited

FOREIGN PATENT DOCUMENTS

| | | | |
|---|---|---|---|
| JP | 2004291432 A | | 10/2004 |
| JP | 2008521585 A | | 6/2008 |
| JP | 2009241462 A | | 10/2009 |
| JP | 201120021 A | | 2/2011 |
| JP | 2012232236 A | | 11/2012 |
| JP | 201323646 A | | 2/2013 |
| JP | 2013023646 A | * | 2/2013 |

OTHER PUBLICATIONS

International Search Report from Application No. PCT/JP2018/023710 dated Aug. 21, 2018, 2 pages.

* cited by examiner

DECORATIVE MATERIAL

CROSS-REFERENCE TO RELATED APPLICATIONS

This application is a national phase entry under 35 U.S.C. § 371 of International Application No. PCT/JP2018/023710 filed Jun. 21, 2018, which claims the priority from Japanese Patent Application No. 2017-124849 filed in the Japanese Patent Office on Jun. 27, 2017, the entire disclosures of which are hereby incorporated by reference herein.

TECHNICAL FIELD

The present invention relates to a decorative material having bright appearance.

BACKGROUND ART

Technologies related to a decorative material have been disclosed. For example, a PVC sheet and a PVC leather are disclosed in Patent Literature 1. In the PVC sheet and the PVC leather, a semi-transparent soft vinyl chloride resin layer having a deep color is laminated on an opaque soft vinyl chloride resin layer having a deep color. The semi-transparent soft vinyl chloride resin layer contains a color-flop pigment particle. The color-flop pigment particle is an inorganic particle coated with iron oxide or titanium oxide. As the inorganic particle, aluminum, stainless steel, mica, or seashell is exemplified. The semi-transparent soft vinyl chloride resin layer contains the color-flop pigment particle of 0.05 to 1 parts by weight relative to vinyl chloride resin of 100 parts by weight. In the semi-transparent soft vinyl chloride resin layer, the vinyl chloride resin is a single composition. However, the vinyl chloride resin may be a copolymer with ethylene, acetic acid vinyl, vinyl ether, or maleic acid ester. As a plasticizer added to the vinyl chloride resin, a phthalic acid ester plasticizer, an aliphatic dibasic acid ester plasticizer, a trimellitic acid ester plasticizer, a phosphoric acid ester plasticizer, a polyester plasticizer, or an epoxy plasticizer is exemplified. The semi-transparent soft vinyl chloride resin layer contains the plasticizer of 60 to 120 parts by weight relative to vinyl chloride resin of 100 parts by weight. In the opaque soft vinyl chloride resin layer, vinyl chloride resin and a plasticizer are same as those of the semi-transparent soft vinyl chloride resin layer. To provide the opaque deep color, the opaque soft vinyl chloride resin layer contains the deep color pigment of 10 to 40 parts by weight relative to vinyl chloride resin of 100 parts by weight. The semi-transparent soft vinyl chloride resin layer has a thickness of 0.1 mm to 1 mm. The opaque soft vinyl chloride resin layer has a thickness of 0.2 mm to 2 mm. As base fabric of the PVC leather, woven fabric, knitted fabric, or non-woven fabric made of one or a blended fiber of various fibers described below is exemplified. As the aforementioned fibers, cotton, rayon, polyester, nylon, vinylon, and polypropylene are exemplified.

The applicant discloses a technology related to a bright natural leather in Patent Literature 2. That is, in Patent Literature 2, the bright natural leather is formed by sequentially laminating a base coat layer, a first color coat layer, a second color coat layer, and a top coat layer on the front face of a natural leather base material. Each aforementioned layer is a layer mainly made of synthesis resin. The first color coat layer contains chromatic color pigment. The second color coat layer contains bright pigment and chromatic color pigment. In Patent Literature 2, metallic pigment and pearl pigment are exemplified as typical bright pigment. The metallic pigment develops metallic-tone luster. The pearl pigment develops pearl-tone luster.

CITATION LIST

Patent Literature

Patent Literature 1: JP-A-H08-192502
Patent Literature 2: JP-A-2013-23646

SUMMARY OF INVENTION

Problems to be Solved by the Invention

A decorative material containing bright pigment is practically used. The bright pigment has luster. Thus, such a decorative material has bright appearance. In other words, a viewer of the decorative material can observe bright appearance from the decorative material. The inventor carried out studies on the decorative material having bright appearance for a technology that can achieve increase of color variation of the front face of the decorative material. In the studies, the inventor considered, for example, saturation at the front face of the decorative material.

The present invention is intended to provide a decorative material that can achieve increase of front face color variation.

Solutions to Problems

One aspect of the present invention is a decorative material including: a base material; a first cover layer that is laminated on the base material, covers the base material, and is made of opaque synthesis resin; and a second cover layer that is laminated on the first cover layer, covers the first cover layer, and is made of chromatic and transparent synthesis resin, wherein the first cover layer contains first coloring pigment having no luster, and bright pigment having luster, and the second cover layer contains second coloring pigment having no luster.

In this decorative material, the first cover layer may contain a first amount of the first coloring pigment per unit volume, and the second cover layer may contain a second amount of the second coloring pigment per unit volume, the second amount being smaller than the first amount. Moreover, the first cover layer may contain a third amount of the first coloring pigment per unit area, and the second cover layer may contain a fourth amount of the second coloring pigment per unit area, the fourth amount being smaller than the third amount. Furthermore, in the second cover layer, the difference between an L* value in an L*a*b* color system of JIS Z 8781-4 for light reflected toward a virtual straight line orthogonal to a front face of the decorative material by 15° from regular reflected light having a reflection angle of 45° with respect to the virtual straight line through reflection of light at the front face of the decorative material at an incident angle of 45° with respect to the virtual straight line and the L* value for light reflected toward the virtual straight line by 45° from the regular reflected light may be set to be equal to or larger than 20. In addition, the second cover layer may not contain the bright pigment. Moreover, the first cover layer may contain first bright pigment as the bright pigment, and the second cover layer may contain second bright pigment having luster.

According to such a decorative material, it is possible to change color of the front face of the entire decorative material by changing one or both of the content amount and material of the second coloring pigment in the second cover layer when color of the first cover layer remains same. The change of the content amount of the second coloring pigment can be performed by changing the second amount of the second coloring pigment per unit volume or the fourth amount of the second coloring pigment per unit area. The second amount of the second coloring pigment per unit volume corresponds to the content rate of the second coloring pigment. It is possible to achieve high saturation at the front face of the decorative material. It is possible to provide depth to the color of the front face of decorative material by covering the first cover layer with the second cover layer and setting the L* value difference under the above-described condition to be equal to or larger than 20. In the above-described decorative material, the coloring pigment contained in the first cover layer is referred to as the "first coloring pigment", and the coloring pigment contained in the second cover layer is referred to as the "second coloring pigment". The first coloring pigment and the second coloring pigment may be the same coloring pigment or may be coloring pigments different from each other. As for the bright pigment, when the bright pigment contained in the first cover layer is referred to as the "first bright pigment" and the bright pigment contained in the second cover layer is referred to as the "second bright pigment", the first bright pigment and the second bright pigment may be the same bright pigment or may be bright pigments different from each other. The aforementioned different bright pigments include, for example, bright pigments that are same in material but different in a property other than material, or bright pigments that are different from each other in material but same in a property other than material. As the aforementioned properties other than material, the form of each bright pigment and the film thickness of a cover film formed on the surface of the bright pigment are exemplified.

In the second cover layer, an L* value in an L*a*b* color system of JIS Z 8781-4 may be set to be higher than the L* value of the first cover layer. With this configuration, it is possible to visually recognize the first cover layer through the second cover layer that is chromatic and transparent. It is possible to improve a sense of depth with the decorative material.

Advantageous Effects of the Invention

According to the present invention, it is possible to obtain a decorative material that can achieve increase of front face color variation.

BRIEF DESCRIPTION OF DRAWINGS

FIG. 2 schematically illustrates a measurement method of Experiments 2 and 3.

FIG. 3 illustrates front faces of Samples 1 and 2 as targets in Experiment 1.

DESCRIPTION OF EMBODIMENTS

Figure 1:
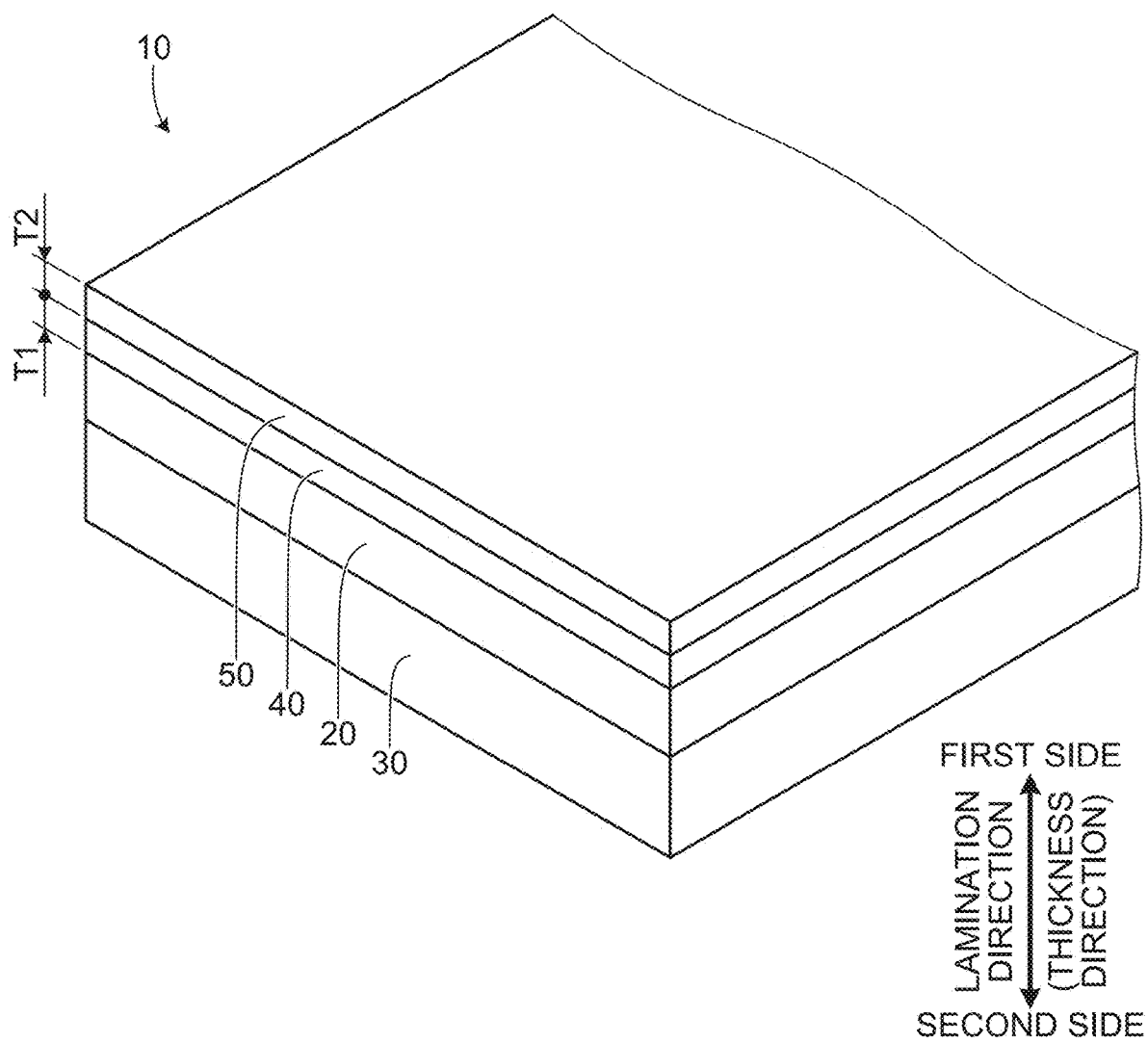
FIG. 1 is a partially perspective view illustrating a schematic exemplary configuration of a decorative material.

An embodiment for performing the present invention will be described below with reference to the accompanying drawings. The present invention is not limited to configurations described below but may also employ various kinds of configurations in the same technical idea. For example, some of the configurations described below may be omitted or replaced with other configurations or the like. The present disclosure may include other configurations.

Decorative Material

A decorative material 10 will be described below with reference to FIG. 1. The decorative material 10 has bright appearance. The bright appearance means glittering appearance as described in, for example, the above-described Patent Literature 2. The decorative material 10 has, for example, a sheet or plate shape. The decorative material 10 is provided on the outer surface of a predetermined product, and forms the outer surface of this product or covers the outer surface of this product. For example, the decorative material 10 forms an interior decorative product of a transfer instrument or is an interior decorative material of a building. As the interior decorative product of the transfer instrument, a seat is exemplified. In this case, the decorative material 10 is a fibrous sheet material. As the fibrous sheet material, leather is exemplified. The leather includes synthesis leather, artificial leather, and natural leather. Furthermore, the interior decorative product includes a seat cover. The seat cover is mounted on a seat. When the transfer instrument is an automobile, the interior decorative product includes, for example, a dashboard and a door trim in addition to a car seat and a seat cover. When the decorative material 10 is a dashboard or a door trim, the decorative material 10 is a resin molding product. As the interior decorative material of the building, cloth is exemplified. The cloth is bonded to a wall surface inside the building. In addition, the decorative material 10 may have a film shape.

The decorative material 10 includes a base material 30, a first cover layer 40, and a second cover layer 50. In the decorative material 10, the base material 30, the first cover layer 40, and the second cover layer 50 are laminated. The order of the lamination is the order of the base material 30, the first cover layer 40, and the second cover layer 50 from a second side toward a first side in a lamination direction. The lamination direction is aligned with the thickness direction of the decorative material 10. Furthermore, the decorative material 10 includes a bonding layer 20. In an embodiment, as for the decorative material 10 and each component forming the decorative material 10, a face on the first side in the lamination direction is referred to as a "front face", and a face on the second side in the lamination direction is referred to as a "back face". The decorative material 10 is a fibrous sheet material.

In the decorative material 10, the bonding layer 20 is provided between the base material 30 and the first cover layer 40 in the lamination direction. The bonding layer 20 joins the base material 30 and the first cover layer 40 integrated with the second cover layer 50. That is, in the decorative material 10, the first cover layer 40 integrated with the second cover layer 50 is bonded to the base material 30 through the bonding layer 20. As a bonding agent forming the bonding layer 20, a polyurethane bonding agent is exemplified.

The base material 30 is a fibrous foundation material containing fibers. The base material 30 has a sheet shape. As the base material 30, well-known woven fabric, knitted fabric, non-woven fabric, or natural leather is exemplified. When the decorative material 10 is a resin molding product unlike the embodiment, the base material 30 is, for example, a resin molding body. When the decorative material 10 is cloth, the base material 30 is, for example, a wallpaper backing sheet or a lamination body made of a wallpaper backing sheet and a resin layer. The bonding layer 20 is formed on the entire front face of the base material 30.

The first cover layer 40 is laminated on the base material 30 and covers the base material 30. The first cover layer 40 is made of opaque synthesis resin. As synthesis resin that is a base in the first cover layer 40, polyurethane is exemplified. However, the aforementioned synthesis resin may be synthesis resin different from polyurethane. The first cover layer 40 contains first coloring pigment and bright pigment. The first coloring pigment is a coloring agent that colors the first cover layer 40. The bright pigment is a bright agent that provides bright appearance to the first cover layer 40. In the first cover layer 40, the content rate of the first coloring pigment preferably has a predetermined value in the range of 5 mass % to 20 mass %, and the content rate of the bright pigment preferably has a predetermined value in the range of 1 mass % to 30 mass %. However, the content rate of the first coloring pigment and the content rate of the bright pigment are exemplary. The content rate of the first coloring pigment and the content rate of the bright pigment in the first cover layer 40 are determined as appropriate with various conditions taken into account. The other description of the first coloring pigment and the bright pigment will be made later.

The second cover layer 50 is laminated on the first cover layer 40 and covers the first cover layer 40. The second cover layer 50 is made of transparent synthesis resin. As synthesis resin that is a base in the second cover layer 50, polyurethane is exemplified. However, the aforementioned synthesis resin may be synthesis resin different from polyurethane. In each of the first cover layer 40 and the second cover layer 50, the synthesis resin that is the base may be an identical material. This is same for the bonding agent forming the bonding layer 20. The second cover layer 50 contains second coloring pigment. The second coloring pigment is a coloring agent that colors the second cover layer 50. In the second cover layer 50, the content rate of the second coloring pigment preferably has a predetermined value in the range of 0.1 mass % to 1.0 mass %. However, the content rate of the second coloring pigment is exemplary. For example, the content rate of the second coloring pigment may be higher than 1.0 mass %. The content rate of the second coloring pigment in the second cover layer 50 is determined as appropriate with various conditions taken into account. The other description of the second coloring pigment will be made later. In the decorative material 10, the second cover layer 50 contains no bright pigment.

In the second cover layer 50, an L* value in an L*a*b* color system is set to be higher than the L* value of the first cover layer 40. The L*a*b* color system is a color space standardized by International Commission on Illumination (CIE 1976). The L*a*b* color system is also specified by JIS (JIS Z 8781-4).

First Coloring Pigment and Second Coloring Pigment

The first coloring pigment and the second coloring pigment are pigments having no luster. The first coloring pigment and the second coloring pigment may be any of achromatic color pigment and chromatic color pigment. As black pigment, carbon is exemplified. As white pigment, titanium oxide is exemplified. As blue pigment, phthalocyanine copper is exemplified. As yellow pigment, chromium titanium is exemplified. The first coloring pigment and the second coloring pigment may be any of inorganic pigment and organic pigment. However, the inventor thinks that organic pigment is preferable from a viewpoint of bright appearance. The bright pigment obtains luster by reflecting light. The organic pigment has a transparent property. Thus, with the organic pigment, it is possible to deliver light sufficient for providing luster to the bright pigment. Accordingly, it is possible to further enhance the bright appearance. One or both of the first coloring pigment and the second coloring pigment may be a composite of two or more kinds of coloring pigment. The first coloring pigment and the second coloring pigment may be the same coloring pigment or may be coloring pigments different from each other. In the decorative material 10, well-known coloring pigment can be employed as the first coloring pigment and the second coloring pigment. Thus, the other description of the first coloring pigment and the second coloring pigment is omitted.

Bright Pigment

Bright pigment is pigment having luster. Various kinds of types of the bright pigment are practically used. For example, as described in Patent Literature 2, metallic pigment and pearl pigment are practically used. As the metallic pigment, bright pigment as follows is exemplified. That is, as the metallic pigment, powder or flake of metal (alloy) is exemplified. As the aforementioned metal (alloy), aluminum, copper, or brass is exemplified. In addition, as the metallic pigment, a minute cut piece of a metal evaporation-coated film is exemplified. As the pearl pigment, bright pigment as follows is exemplified. That is, as the pearl pigment, natural mica covered with one layer or a plurality of layers of metallic oxide, or synthesis mica covered with one layer or a plurality of layers of metallic oxide is exemplified. As the metallic oxide, titanium oxide, silicon oxide, or iron oxide is exemplified. In addition, as the pearl pigment, a minute cut piece of a film as follows is exemplified. The aforementioned film is a film in which a plurality of layers of resins having optical refractive indexes different from each other are laminated. Furthermore, as the pearl pigment, pearl powder, seashell inner wall powder, and argentine are exemplified. In addition, as the bright pigment, graphite is exemplified. In the decorative material 10, well-known bright pigment can be employed as the bright pigment. Thus, the other description of the bright pigment is omitted.

Method of Producing First Cover Layer and Second Cover Layer

The first cover layer 40 and the second cover layer 50 are both formed by a well-known production method. As the production method, a roll coat method or a spray coat method is exemplified. In addition, the production method may be a printing method. The manner of the production method is determined as appropriate with various conditions taken into account. The method of producing the first cover layer 40 and the method of producing the second cover layer 50 may be different manners.

Well-known ink is used to produce the first cover layer 40 and the second cover layer 50. For example, solvent ink is used to produce the first cover layer 40 and the second cover layer 50. However, a different kind of ink other than the solvent ink may be used. In the embodiment, ink for forming the first cover layer 40 is referred to as "first ink", and ink for forming the second cover layer 50 is referred to as "second ink".

The first ink contains synthesis resin, the first coloring pigment, and the bright pigment. The second ink contains synthesis resin and the second coloring pigment but contains no bright pigment. Furthermore, the first ink and the second ink each contains a solvent. When the first ink and the second ink are solvent ink, the solvent is an organic solvent. A solvent of aqueous ink is water. In the first ink and the second ink, after application, the solvent evaporates and the synthesis resin dries. Accordingly, the first cover layer 40 is formed from the first ink, and the second cover layer 50 is formed from the second ink.

In the second ink, the content rate (concentration) of the second coloring pigment in the second ink is set to be lower than the content rate (concentration) of the first coloring pigment in the first ink. Thus, in the decorative material 10, the content rate of the second coloring pigment in the second cover layer 50 is lower than the content rate of the first coloring pigment in the first cover layer 40. In other words, a second amount of the second coloring pigment contained in the second cover layer 50 per unit volume is smaller than a first amount of the first coloring pigment contained in the first cover layer 40 per unit volume.

A thickness T1 of the first cover layer 40 and a thickness T2 of the second cover layer 50 preferably have, for example, predetermined values in the range of 5 μm to 60 μm. In the decorative material 10, the thicknesses T1 and T2 have identical dimensions. However, the thicknesses T1 and T2 may have dimensions different from each other. That is, the thicknesses T1 and T2 are determined as appropriate with various conditions taken into account. In the decorative material 10, irrespective of the relation between the thicknesses T1 and T2, a fourth amount of the second coloring pigment contained in the second cover layer 50 per unit area is preferably smaller than a third amount of the first coloring pigment contained in the first cover layer 40 per unit area.

The relation between the first amount of the first coloring pigment per unit volume and the third amount of the first coloring pigment per unit area is as follows. That is, when the first amount of the first coloring pigment per unit volume remains same, the third amount of the first coloring pigment per unit area increases and decreases in proportional to the thickness change rate. For example, when the thickness T1 of the first cover layer 40 is doubled while the first amount of the first coloring pigment per unit volume remains same, the third amount of the first coloring pigment per unit area becomes twice its value before the thickness increase. The relation between the second amount of the second coloring pigment per unit volume and the fourth amount of the second coloring pigment per unit area is as follows. That is, when the second amount of the second coloring pigment per unit volume remains same, the fourth amount of the second coloring pigment per unit area increases and decreases in proportional to the thickness change rate. For example, when the thickness T2 of the second cover layer 50 is doubled while the second amount of the second coloring pigment per unit volume remains same, the fourth amount of the second coloring pigment per unit area becomes twice its value before the thickness increase.

Example

The inventor performed Experiments 1 to 3 to check effectiveness of the decorative material 10 of the embodiment. In Experiment 1, two experiment samples were produced under conditions different from each other, and the front faces of the two experiment samples was visually observed. In Experiment 2, five experiment samples were produced under conditions different from each other, and the colors of the front faces of the five experiment samples were measured. In Experiment 3, six experiment samples were produced for each color under conditions different from each other, the difference between lightnesses in highlight and shade and saturation in highlight were determined for the six experiment samples for each color. In Experiment 3, four colors that provide impressions different from each other at first glance were targeted. The following describes results obtained by Experiments 1 to 3. In the description, for clear correspondence to the above description, any component identical to that of the decorative material 10 described above is denoted by a reference sign identical to that in the above description. However, in the example, the first coloring pigment and the second coloring pigment are simply referred to as "coloring pigment".

Experiment 1

(1) Experiment Method (1-1) Experiment Sample

Experiment 1 was performed for Samples 1 and 2 that were synthesis leather. Sample 1 is a decorative material in which the first cover layer 40 is covered by the second cover layer 50 (refer to FIG. 2). Sample 1 corresponds to the decorative material 10 illustrated in FIG. 1. Sample 2 is a decorative material in which the first cover layer 40 is covered by a third cover layer 60 (refer to FIG. 2). The third cover layer 60 is a covering layer made of colorless and transparent synthesis resin. The third cover layer 60 contains no coloring pigment nor bright pigment. In Samples 1 and 2, similarly to the decorative material 10, the bonding layer 20 was provided.

(1-2) Production Method

Sample 1 was produced as follows. That is, in the first process, the second ink was applied on flat exfoliate paper. As described above, the second ink forms the second cover layer 50. In the second process, the second ink applied on the exfoliate paper was dried by thermal treatment. The second cover layer 50 was formed as the second process ended. In the third process, the first ink was applied on the second cover layer 50. As described above, the first ink forms the first cover layer 40. The face of the second cover layer 50 on which the first ink was applied was the back face of the second cover layer 50 in the decorative material 10. In the fourth process, the first ink applied on the second cover layer 50 was dried by thermal treatment. The first cover layer 40 was formed as the fourth process ended. The first cover layer 40 was integrated with the second cover layer 50. In the fifth process, the bonding agent was applied on the first cover layer 40. As described above, the bonding agent forms the bonding layer 20 through curing. The bonding agent was a polyurethane bonding agent. The face of the first cover layer 40 on which the bonding agent was applied was the back face of the first cover layer 40 in the decorative material 10. In the sixth process, the second cover layer 50 and the first cover layer 40 integrated with each other on the exfoliate paper were bonded to the base material 30. The sixth process was performed while the bonding agent was viscous. The face of the base material 30 on which the second cover layer 50 and the first cover layer 40 were bonded to each other through the bonding agent was the front face of the base material 30 in the decorative material 10. In the seventh process, the exfoliate paper was removed. Accordingly, Sample 1 was acquired. In the first process and the fourth process, an applicator was used.

Sample 2 was produced through the first to seventh processes described above. However, in the first process, clear ink containing no coloring pigment nor bright pigment was used. In the second process, this ink applied on the exfoliate paper was dried by thermal treatment. The third cover layer 60 was formed as the second process ended. In the third process, the first ink was applied on the third cover layer 60. The face of the third cover layer 60 on which the first ink was applied was the back face of the third cover layer 60 in the decorative material. The other points of production of Sample 2 were same as those of Sample 1. Thus, the other description of production of Sample 2 is omitted. Sample 2 was acquired as the seventh process ended. The decorative material 10 can be produced as well by, for example, a method according to such a production method including the first to seventh processes. However, the decorative material 10 may be produced by a production method of a different manner.

(1-3) First Cover Layer, Second Cover Layer, and Third Cover Layer

The configuration of each of the first cover layer 40 of Samples 1 and 2, the second cover layer 50 of Sample 1, and the third cover layer 60 of Sample 2 was as follows. The synthesis resin in each of the first cover layer 40, the second cover layer 50, and the third cover layer 60 was identical synthesis resin manufactured by an identical manufacturer.

First Cover Layer

Synthesis resin: polyurethane
Coloring pigment (type, content rate): red organic pigment and purple organic pigment, 13 mass %
Bright pigment (type, content rate): metallic pigment, 16 mass %
Thickness (refer to "thickness T1" in FIG. 1): 30 μm Second Cover Layer Synthesis resin: polyurethane
Coloring pigment (type, content rate): red organic pigment and purple organic pigment, 0.6 mass %
Bright pigment (content rate): 0 mass %
Thickness (refer to "thickness T2" in FIG. 1): 30 μm Third Cover Layer Synthesis resin: polyurethane
Coloring pigment (content rate): 0 mass %
Bright pigment (content rate): 0 mass %
Thickness: 30 μm In the first cover layer 40 and the second cover layer 50, the red organic pigment used as the coloring pigment was C.I. pigment red 208, and the purple organic pigment used as the coloring pigment was C.I. pigment violet 19. In the first cover layer 40, the mixture ratio of the red and purple organic pigments was "red:purple=0.55:0.63". In the second cover layer 50, the mixture ratio of the red and purple organic pigments was "red:purple=0.55:0.63". In the first cover layer 40, the metallic pigment (particle size ($D_{90}$): 33 μm) used as the bright pigment was bright pigment formed by covering aluminum flake with iron oxide ($Fe_2O_3$ film thickness: 30 nm).

(2) Experiment Result

Figure 3:
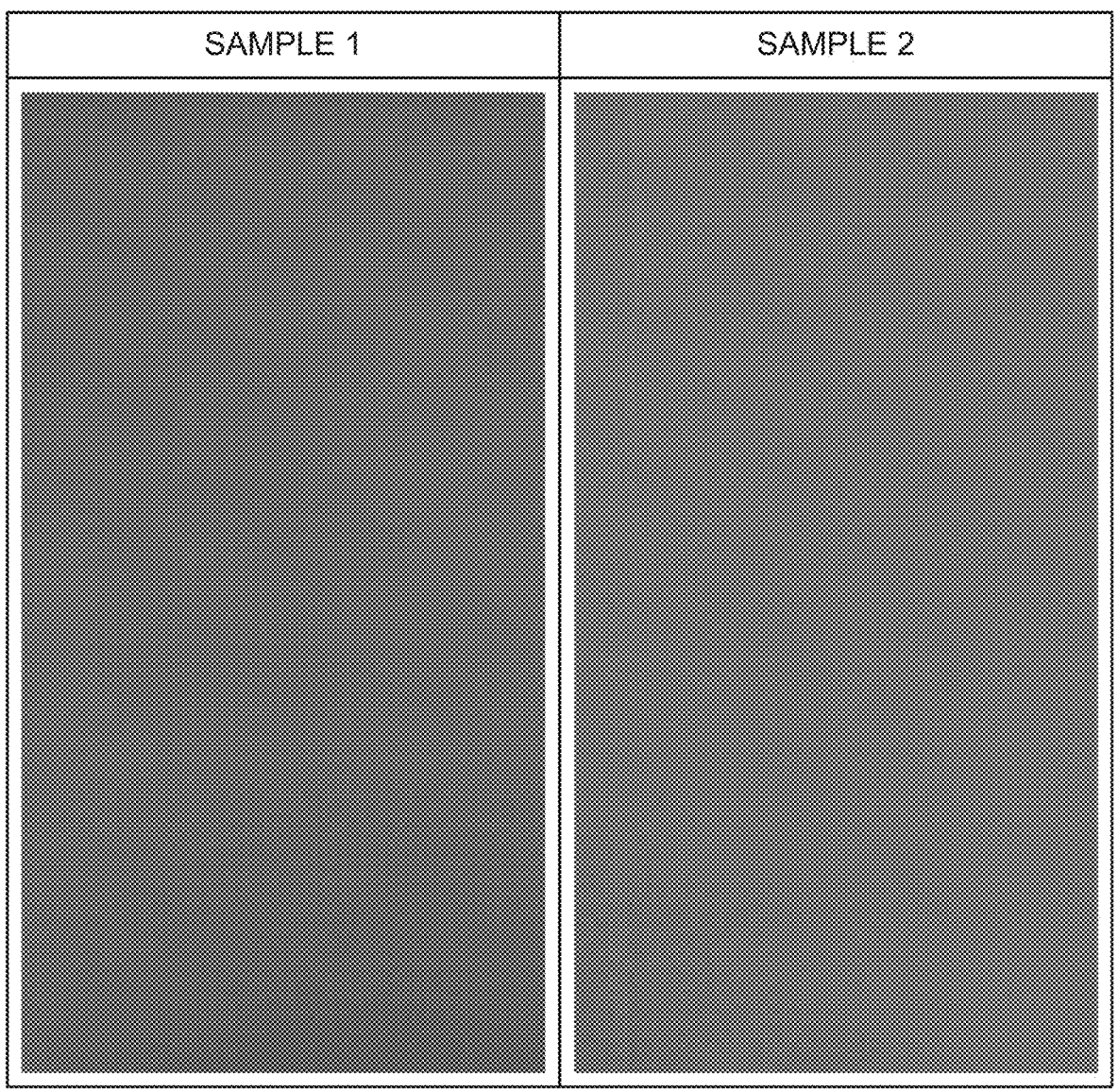
FIG. 3 includes pictures illustrating experiment results of Experiment 1.

As a result (refer to FIG. 3) of observation of the front faces of Samples 1 and 2, the front face was recognized as a red color in Sample 1. However, the front face was recognized as an orange color in Sample 2. The orange color is the color of the first cover layer 40. That is, in Sample 2, the color of the first cover layer 40 was strongly perceived.

Experiment 2

(1) Experiment Method (1-1) Experiment Sample

Experiment 2 was performed for Samples 1 to 5 that were synthesis leather. Table 1 lists the content rates of the coloring pigment and the bright pigment in the first cover layer 40 and the second cover layer 50 of Sample 1 and the first cover layer 40 and the third cover layer 60 of Samples 2 to 5.

TABLE 1

| SAMPLE | FIRST COVER LAYER (40) | | SECOND COVER LAYER (50) OR THIRD COVER LAYER (60) | |
|---|---|---|---|---|
| | COLORING PIGMENT (MASS %) | BRIGHT PIGMENT (MASS %) | COLORING PIGMENT (MASS %) | BRIGHT PIGMENT (MASS %) |
| 1 | 13 | 16 | 0.6 | 0 |
| 2 | 13 | 16 | 0 | 0 |
| 3 | 25 | 16 | 0 | 0 |
| 4 | 29 | 16 | 0 | 0 |
| 5 | 35 | 16 | 0 | 0 |

Sample 1 is an experiment sample with conditions identical to those of Sample 1 in Experiment 1. Sample 2 is an experiment sample with conditions identical to those of Sample 2 in Experiment 1. Samples 3 to 5 are experiment samples corresponding to Sample 2. That is, similarly to Sample 2, Samples 3 to 5 are each a decorative material in which the first cover layer 40 is covered by the third cover layer 60 (refer to FIG. 2). Furthermore, similarly to Sample 2, Samples 3 to 5 each include the bonding layer 20. The difference among Samples 2 to 5 is the content rate of the coloring pigment in the first cover layer 40. In Samples 2 to 5, the third cover layer 60 is an identical cover layer. Similarly to Sample 2, Samples 3 to 5 are produced through the first to seventh processes of the production method described above. The other description of Samples 1 to 5 is as described above and thus omitted.

(1-2) Measurement Method

Figure 2:
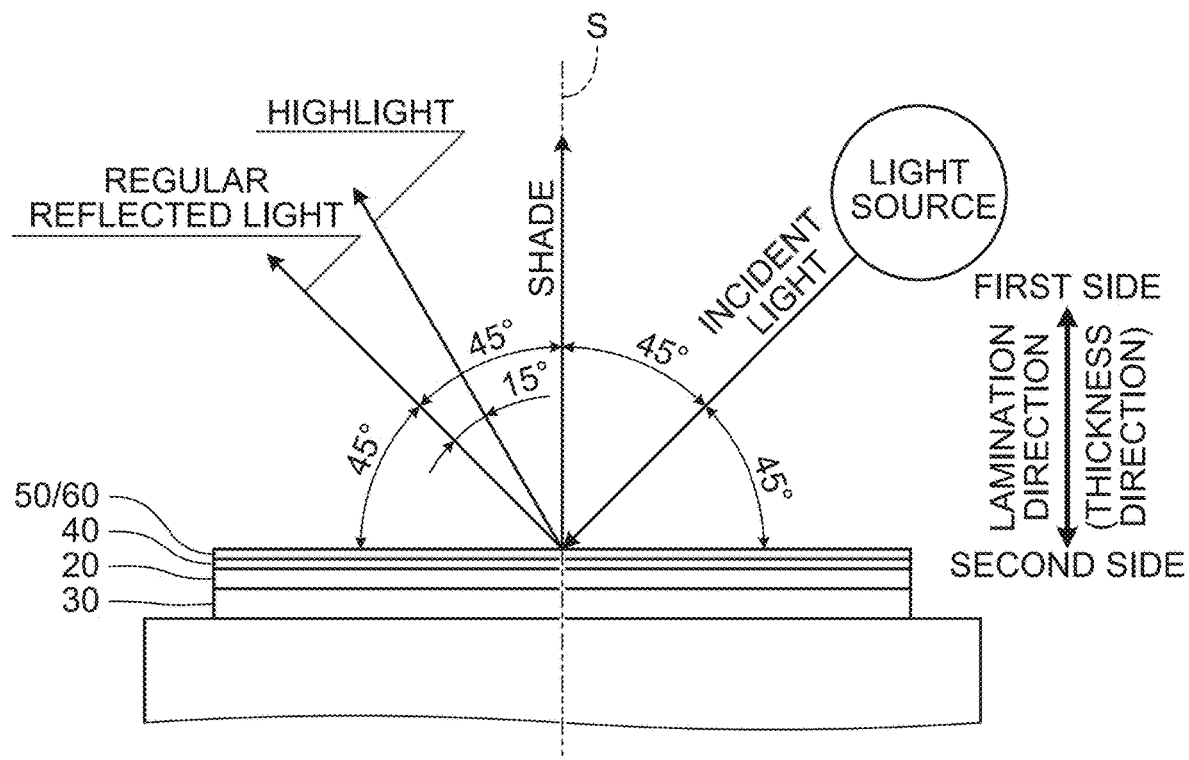
FIG. 2 is a diagram illustrating a decorative material as an experiment sample in Experiments 1 to 3.

For Samples 1 to 5, the L* value, the a* value, and the b* value of the color of the front face in the L*a*b* color system were measured (refer to FIG. 2). The measurement was performed for highlight and shade. The angles of the highlight and the shade with respect to incident light and regular reflected light were set in respective states illustrated in FIG. 2. The highlight was in the direction of reflection toward a virtual straight line S by 15° from the regular reflected light. The shade was in the direction along the virtual straight line S. The virtual straight line S is a virtual straight line along the direction orthogonal to the front face of a decorative material. The aforementioned decorative material is Samples 1 to 5 in Experiment 2, and is Samples A1 to A6, B1 to B6, C1 to C6, and D1 to D6 in Experiment 3 to be described later. In FIG. 2, the virtual straight line S is illustrated with a dashed and double-dotted line. Light having a high reflection intensity near the regular reflected light exists in the highlight. In the highlight, reflection by the bright pigment is strong. Light having a low reflection intensity away from the regular reflected light exists in the shade. A three-dimensional gonio-spectrophotometric color measurement system (GCMS-3B) manufactured by MURAKAMI COLOR RESEARCH LABORATORY CO., LTD. was used for the measurement. A light source was D65. Thereafter, the C* value was calculated from Equation 1 below based on the a* value and the b* value obtained by the measurement. The L* value is referred to as a lightness index. The a* value and the b* value are each referred to as a chromaticness index. The a* value and the b* value each correspond to chromaticity indicating hue and saturation. The a* value (+) indicates a red direction. The a* value (−) indicates a green direction. The b* value (+) indicates a yellow direction. The b* value (−) indicates a blue direction. The C* value indicates saturation.

[Expression 1]

$$c^* = \sqrt{(a^*)^2 + (b^*)^2} \qquad (1)$$

(2) Experiment Result

Experiment results will be described below with reference to Table 2. Samples 1 and 2 to 5 are compared. In the shade, the L* value of Sample 1 was different from the L* value of Sample 2 by less than one and was equivalent to the L* value of Sample 2. However, the L* value of Sample 1 indicated a value slightly lower than the L* value of Sample 2. In the highlight, the L* value of Sample 1 indicated a value lower than the L* value of Sample 2. In the shade and the highlight, the a* value of Sample 1 indicated a value higher than the a* value of Sample 2. The difference between the a* value of Sample 1 and the a* value of Sample 2 was 3.2 in the shade and 8.8 in the highlight. In the shade, the b* value of Sample 1 was different from the b* value of Sample 2 by less than one and was equivalent to the b* value of Sample 2. However, the b* value of Sample 1 indicated a value slightly lower than the b* value of Sample 2. In the highlight, the b* value of Sample 1 indicated a value lower than the b* value of Sample 2. In the shade and the highlight, the C* value of Sample 1 indicated a value higher than the C* value of Sample 2. The difference between the C* value of Sample 1 and the C* value of Sample 2 was 2.1 in the shade and 2.6 in the highlight. Such results match with the fact that Sample 1 was red as compared to Sample 2 in Experiment 1.

In the shade and the highlight, the L* value of Sample 1 was different from the L* value of Sample 3 by less than one and was equivalent to the L* value of Sample 3. However, the L* value of Sample 1 indicated a value slightly higher than the L* value of Sample 3 in the shade, but the L* value of Sample 1 indicated a value slightly lower than the L* value of Sample 3 in the highlight. In the shade and the highlight, the L* value of Sample 1 indicated a value higher than the L* values of Samples 4 and 5. In the shade, the a* value of Sample 1 was different from the a* values of Samples 3 to 5 by less than one and was equivalent to the a* values of Samples 3 to 5. However, the a* value of Sample 1 was a highest value. In the highlight, the a* value of Sample 1 indicated a value higher than the a* values of Samples 3 to 5. As for the highlight, when the a* value of Sample 1 was compared with Sample 3 having the highest a* value among Samples 3 to 5, the difference therebetween was 5.2. In the shade and the highlight, the b* value of Sample 1 was different from the b* value of Sample 3 by less than one and was equivalent to the b* value of Sample 3. However, the b* value of Sample 1 indicated a value slightly higher than the b* value of Sample 3 in the shade, but the b* value of Sample 1 indicated a value slightly lower than the b* value of Sample 3 in the highlight. In the shade and the highlight, the b* value of Sample 1 indicated a value higher than the b* values of Samples 4 and 5. In the shade, the C* value of Sample 1 was different from the C* value of Sample 3 by less than one and was equivalent to the C* value of Sample 3. However, the C* value of Sample 1 indicated a value slightly higher than the C* value of Sample 3. In the shade, the C* value of Sample 1 indicated a value higher than the C* values of Samples 4 and 5. In the highlight, the C* value of Sample 1 indicated a value higher than the C* values of Samples 3 to 5. As for the highlight, when the C* value of Sample 1 was compared with Sample 3 having the highest C* value among Samples 3 to 5, the difference therebetween was 3.7.

Samples 2 to 5 are compared. In the shade and the highlight, the L* value of Sample 2 indicated the highest value among the L* values of Samples 2 to 5. As for the a* value and the b* value, in the shade and the highlight, the a* values of Samples 3 to 5 indicated a value higher than the a* value of Sample 2, and the b* values of Samples 3 to 5 indicated a value lower than the b* value of Sample 2. This is thought to be because the content rate of the coloring pigment in the first cover layer 40 is higher in Samples 3 to 5 than in Sample 2. The C* values of Samples 3 to 5 indicated a value higher than the C* value of Sample 2 in the shade, but indicated a value lower than the C* value of Sample 2 in the highlight. Comparison of Samples 3 to 5 obtained a result as follows. That is, in the shade, the a* values of Samples 3 to 5 slightly increased along with increase of the content rate of the coloring pigment in the first cover layer 40. However, in the highlight, the a* values of Samples 3 to 5 decreased along with the aforementioned increase of the content rate. The phenomenon of value decrease along with increase of the content rate of the coloring pigment in the first cover layer 40 was also checked for the L* value, the b* value, and the C* value. That is, in the shade and the highlight, the L* values, the b* values, and the C* values of Samples 3 to 5 decreased along with increase of the content rate of the coloring pigment in the first cover layer 40.

TABLE 2

| SAMPLE | SHADE | | | | HIGHLIGHT | | | |
|---|---|---|---|---|---|---|---|---|
| | L* | a* | b* | C* | L* | a* | b* | C* |
| 1 | 21.3 | 40.9 | 27.9 | 49.5 | 45.3 | 72.2 | 56.5 | 91.7 |
| 2 | 21.4 | 37.7 | 28.7 | 47.4 | 51.9 | 63.4 | 62.6 | 89.1 |
| 3 | 20.8 | 40.3 | 27.6 | 48.9 | 45.9 | 67.0 | 57.0 | 88.0 |
| 4 | 20.0 | 40.5 | 26.5 | 48.4 | 42.7 | 66.0 | 53.5 | 85.0 |
| 5 | 18.8 | 40.6 | 24.7 | 47.5 | 38.3 | 64.1 | 49.6 | 81.0 |

Experiment 3

(1) Experiment Method (1-1) Experiment Sample

Experiment 3 was performed for Samples A1 to A6, B1 to B6, C1 to C6, and D1 to D6 that were synthesis leather.

Samples A1 to A6 are each a decorative material that is recognized as an orange color in impression at first glance. Samples B1 to B6 are each a decorative material that is recognized as a red color in impression at first glance. Samples C1 to C6 are each a decorative material that is recognized as a green color in impression at first glance. Samples D1 to D6 are each a decorative material that is recognized as a blue color in impression at first glance. Samples A1 to A6, B1 to B6, C1 to C6, and D1 to D6 are each a decorative material in which the first cover layer 40 is covered by the second cover layer 50 (refer to FIGS. 1 and 2).

Similarly to Sample 1 in Experiment 1, Samples A1 to A6, B1 to B6, C1 to C6, and D1 to D6 each include the bonding layer 20. Similarly to Sample 1 in Experiment 1, Samples A1 to A6, B1 to B6, C1 to C6, and D1 to D6 are produced through the first to seventh processes of the production method described above. The other description of the method of producing Samples A1 to A6, B1 to B6, C1 to C6, and D1 to D6 is same as described above and thus omitted.

(1-2) First Cover Layer and Second Cover Layer (A) Samples A1 to A6

The configurations of the first cover layer 40 and the second cover layer 50 of Samples A1 to A6 were as follows. In Samples A1 to A6, the synthesis resin in each of the first cover layer 40 and the second cover layer 50 was identical synthesis resin manufactured by an identical manufacturer.

First Cover Layer

Synthesis resin: polyurethane
Coloring pigment (type, content rate, content amount per unit area): red organic pigment and purple organic pigment, 13 mass %, 4.12 g/m$^2$
Bright pigment (type, content rate): metallic pigment, 16 mass %
Thickness (refer to "thickness T1" in FIG. 1): 30 μm Second Cover Layer Synthesis resin: polyurethane
Coloring pigment (type): red organic pigment and purple organic pigment
Coloring pigment (content rate, content amount per unit area)
  Sample A1: 0.6 mass %, 0.13 g/m$^2$
  Sample A2: 0.6 mass %, 0.25 g/m$^2$
  Sample A3: 1.8 mass %, 0.38 g/m$^2$
  Sample A4: 1.8 mass %, 0.75 g/m$^2$
  Sample A5: 9.0 mass %, 1.88 g/m$^2$
  Sample A6: 9.0 mass %, 3.77 g/m$^2$
Bright pigment (content rate): 0 mass %
Thickness (refer to "thickness T2" in FIG. 1)
  Samples A1, A3, and A5: 20 μm
  Samples A2, A4, and A6: 40 μm In the first cover layer 40 and the second cover layer 50 of Samples A1 to A6, the red organic pigment used as the coloring pigment was C.I. pigment red 208, and the purple organic pigment used as the coloring pigment was C.I. pigment violet 19. In the first cover layer 40, the mixture ratio of the red and purple organic pigments was "red:purple=0.55:0.63". In the second cover layer 50, the mixture ratio of the red and purple organic pigments was "red:purple=0.55:0.63". In the first cover layer 40, the metallic pigment (particle size ($D_{90}$): 33 μm) used as the bright pigment was bright pigment formed by covering aluminum flake with iron oxide ($Fe_2O_3$ film thickness: 30 nm).

(B) Samples B1 to B6

The configurations of the first cover layer 40 and the second cover layer 50 of Samples B1 to B6 were as follows. However, in the second cover layer 50 of Samples B1 to B6, the content rate of coloring pigment and the amount of coloring pigment per unit area were set to be same as those in Samples A1 to A6 (B1=A1, B2=A2, B3=A3, B4=A4, B5=A5, B6=A6). In Samples B1 to B6, the synthesis resin in each of the first cover layer 40 and the second cover layer 50 was identical synthesis resin manufactured by an identical manufacturer.

First Cover Layer

Synthesis resin: polyurethane
Coloring pigment (type, content rate, content amount per unit area): red organic pigment, 13 mass %, 4.12 g/m$^2$
Bright pigment (type, content rate): metallic pigment, 16 mass %
Thickness (refer to "thickness T1" in FIG. 1): 30 μm Second Cover Layer Synthesis resin: polyurethane
Coloring pigment (type): red organic pigment
Bright pigment (content rate): 0 mass %
Thickness (refer to "thickness T2" in FIG. 1)
  Samples B1, B3, and B5: 20 μm
  Samples B2, B4, and B6: 40 μm In the first cover layer 40 and the second cover layer 50 of Samples B1 to B6, the red organic pigment used as the coloring pigment was C.I. pigment red 208. In the first cover layer 40, the metallic pigment (particle size ($D_{50}$): 14 μm) used as the bright pigment was bright pigment formed by covering aluminum flake with coloring pigment (C.I. pigment red 254).

(C) Samples C1 to C6

The configurations of the first cover layer 40 and the second cover layer 50 of Samples C1 to C6 were as follows. However, in the second cover layer 50 of Samples C1 to C6, the content rate of coloring pigment and the amount of coloring pigment per unit area were set to be same as those in Samples A1 to A6 (C1=A1, C2=A2, C3=A3, C4=A4, C5=A5, C6=A6). In Samples C1 to C6, the synthesis resin in each of the first cover layer 40 and the second cover layer 50 was identical synthesis resin manufactured by an identical manufacturer.

First Cover Layer

Synthesis resin: polyurethane
Coloring pigment (type, content rate, content amount per unit area): green organic pigment, 13 mass %, 4.12 g/m$^2$
Bright pigment (type, content rate): metallic pigment, 16 mass %
Thickness (refer to "thickness T1" in FIG. 1): 30 μm Second Cover Layer Synthesis resin: polyurethane
Coloring pigment (type): green organic pigment Bright pigment (content rate): 0 mass %
Thickness (refer to "thickness T2" in FIG. 1)
Samples C1, C3, and C5: 20 μm
Samples C2, C4, and C6: 40 μm
In the first cover layer 40 and the second cover layer 50 of Samples C1 to C6, the green organic pigment used as the coloring pigment was C.I. pigment green 7. In the first cover layer 40, the metallic pigment (particle size ($D_{50}$): 14 μm) used as the bright pigment was bright pigment formed by covering aluminum flake with coloring pigment (C.I. pigment green 7).

(D) Samples D1 to D6

The configurations of the first cover layer 40 and the second cover layer 50 of Samples D1 to D6 were as follows. In Samples D1 to D6, the synthesis resin in each of the first cover layer 40 and the second cover layer 50 was identical synthesis resin manufactured by an identical manufacturer.

First Cover Layer

Synthesis resin: polyurethane
Coloring pigment (type, content rate, content amount per unit area): blue organic pigment, 13 mass %, 4.12 g/m²
Bright pigment (type, content rate): metallic pigment, 16 mass %
Thickness (refer to "thickness T1" in FIG. 1): 30 μm Second Cover Layer Synthesis resin: polyurethane
Coloring pigment (type): blue organic pigment
Coloring pigment (content rate, content amount per unit area)
Sample D1: 0.6 mass %, 0.44 g/m²
Sample D2: 0.6 mass %, 0.89 g/m²
Sample D3: 1.8 mass %, 1.33 g/m²
Sample D4: 1.8 mass %, 2.66 g/m²
Sample D5: 9.0 mass %, 6.65 g/m²
Sample D6: 9.0 mass %, 13.29 g/m²
Bright pigment (content rate): 0 mass %
Thickness (refer to "thickness T2" in FIG. 1)
Samples D1, D3, and D5: 20 μm
Samples D2, D4, and D6: 40 μm
In the first cover layer 40 and the second cover layer 50 of Samples D1 to D6, the blue organic pigment used as the coloring pigment was C.I. pigment blue 29. In the first cover layer 40, the metallic pigment (particle size ($D_{50}$): 14 μm) used as the bright pigment was bright pigment formed by covering aluminum flake with coloring pigment (C.I. pigment blue 15:1).

(1-3) Measurement Method

For Samples A1 to A6, B1 to B6, C1 to C6, and D1 to D6, the L* value, the a* value, and the b* value of the color of the front face in the L*a*b* color system were measured (refer to FIG. 2). The measurement was performed for the shade and the highlight. However, in the shade, the L* value was measured, and measurement of the a* value and the b* value was omitted. In the highlight, the L* value, the a* value, and the b* value were measured. Similarly to Experiment 2, the angles of the shade and the highlight were set in the respective states illustrated in FIG. 2. The system and the light source for the measurement were same as those in Experiment 2. Thereafter, a ΔL* value was calculated. The ΔL* value is referred to as lightness difference. The ΔL* value is the difference between the L* value of the highlight and the L* value of the shade obtained by the measurement. In Experiment 3, the ΔL* value was a value obtained by subtracting the L* value of the shade from the L* value of the highlight (the ΔL* value=the L* value (the highlight)−the L* value (the shade)). The C* value of the highlight was calculated from Equation 1 described above based on the a* value and the b* value of the highlight.

(1-4) Sensory Evaluation

For Samples A1 to A6, B1 to B6, C1 to C6, and D1 to D6, sensory evaluation was performed on the color depth of the front face in accordance with an evaluation reference as follows. In this evaluation reference, the color depth is more excellent as an evaluation value increases.

Evaluation Reference

5: Color depth is significantly strongly observed.
4: Color depth is strongly observed.
3: Color depth is observed.
2: Color depth is weakly observed.
1: Color depth is completely not observed.

(2) Experiment Result

Experiment results for Samples A1 to A6 will be described below with reference to Table 3. In this description, "highest" means highest among Samples A1 to A6, and "lowest" means lowest among Samples A1 to A6. As for the L* value of the shade, Sample A1 was highest at 21.3, and Sample A6 was lowest at 18.6. As for the L* value of the highlight, Sample A1 was highest at 56.9, and Sample A6 was lowest at 23.9. As for the ΔL* value, Sample A1 was highest at 35.6, and Sample A6 was lowest at 5.3. As for the a* value of the highlight, Sample A2 was highest at 77.0, and Sample A6 was lowest at 50.0. As for the b* value of the highlight, Sample A1 was highest at 65.4, and Sample A6 was lowest at 28.4. As for the C* value of the highlight, Sample A2 was highest at 99.9, and Sample A6 was lowest at 57.5. Samples A1 to A6 are each a decorative material that is recognized as an orange color in impression at first glance, but in Samples A1 to A6, the front face exhibits orange colors different from each other. In the sensory evaluation, Samples A1 and A2 were evaluated to be highest at "4", Samples A3 and A4 were evaluated to be at "3", Sample A5 was evaluated to be at "2", and Sample A6 was evaluated to be lowest at "1".

TABLE 3

| SAMPLE (ORANGE COLOR) | SHADE L* | HIGHLIGHT L* | a* | b* | C* | ΔL* | SENSORY EVALUATION |
|---|---|---|---|---|---|---|---|
| A1 | 21.3 | 56.9 | 73.5 | 65.4 | 98.4 | 35.6 | 4 |
| A2 | 21.1 | 54.0 | 77.0 | 63.7 | 99.9 | 32.9 | 4 |
| A3 | 20.5 | 48.4 | 75.4 | 57.5 | 94.8 | 27.9 | 3 |
| A4 | 19.7 | 39.9 | 71.6 | 49.1 | 86.8 | 20.2 | 3 |
| A5 | 19.2 | 32.2 | 63.7 | 39.6 | 75.0 | 13.0 | 2 |
| A6 | 18.6 | 23.9 | 50.0 | 28.4 | 57.5 | 5.3 | 1 |

Experiment results for Samples B1 to B6 will be described below with reference to Table 4. In this description, "highest" means highest among Samples B1 to B6 and "lowest" means lowest among Samples B1 to B6. As for the L* value of the shade, Sample B3 was highest at 29.9, and Sample B2 was lowest at 26.9. As for the L* value of the highlight, Sample B1 was highest at 83.8, and Sample B6 was lowest at 40.7. As for the ΔL* value, Sample B1 was highest at 56.4, and Sample B6 was lowest at 12.7. As for the a* value of the highlight, Sample B3 was highest at 102.3, and Sample B6 was lowest at 69.9. As for the b* value of the highlight, Sample B5 was highest at 66.2, and Sample B1 was lowest at 25.2. As for the C* value of the highlight, Sample B4 was highest at 118.0, and Sample B6 was lowest at 80.3. Samples B1 to B6 are each a decorative material that is recognized as a red color in impression at first glance, but in Samples B1 to B6, the front face exhibits red colors different from each other. In the sensory evaluation, Samples B1 and B2 were evaluated to be highest at "5", Samples B3 and B4 were evaluated to be at "4", Sample B5 was evaluated to be at "3", and Sample B6 was evaluated to be lowest at "2".

TABLE 4

| SAMPLE (RED COLOR) | SHADE L* | HIGHLIGHT L* | a* | b* | C* | ΔL* | SENSORY EVALUATION |
|---|---|---|---|---|---|---|---|
| B1 | 27.4 | 83.8 | 91.6 | 25.2 | 95.0 | 56.4 | 5 |
| B2 | 26.9 | 78.7 | 95.8 | 33.2 | 101.4 | 51.8 | 5 |
| B3 | 29.9 | 78.6 | 102.3 | 39.8 | 109.8 | 48.7 | 4 |
| B4 | 28.3 | 67.8 | 100.6 | 61.6 | 118.0 | 39.5 | 4 |
| B5 | 28.1 | 53.4 | 89.7 | 66.2 | 111.5 | 25.3 | 3 |
| B6 | 28.0 | 40.7 | 69.9 | 39.5 | 80.3 | 12.7 | 2 |

Experiment results for Samples C1 to C6 will be described below with reference to Table 5. In this description, "highest" means highest among Samples C1 to C6, and "lowest" means lowest among Samples C1 to C6. As for the L* value of the shade, Sample C1 was highest at 29.8, and Sample C6 was lowest at 17.7. As for the L* value of the highlight, Sample C1 was highest at 124.1, and Sample C6 was lowest at 59.2. As for the ΔL* value, Sample C1 was highest at 94.3, and Sample C6 was lowest at 41.5. As for the a* value of the highlight, Sample C1 was highest at −110.4, and Sample C3 was lowest at −149.8. As for the b* value of the highlight, Sample C3 was highest at 30.2, and Sample C1 was lowest at 9.9. As for the C* value of the highlight, Sample C3 was highest at 152.8, and Sample C1 was lowest at 110.8. Samples C1 to C6 are each a decorative material that is recognized as a green color in impression at first glance, but in Samples C1 to C6, the front face exhibits green colors different from each other. In the sensory evaluation, Samples C1 to C5 other than Sample C6 were evaluated to be highest at "5". However, even Sample C6 was evaluated to be at "4".

TABLE 5

| SAMPLE (GREEN COLOR) | SHADE L* | HIGHLIGHT L* | a* | b* | C* | ΔL* | SENSORY EVALUATION |
|---|---|---|---|---|---|---|---|
| C1 | 29.8 | 124.1 | −110.4 | 9.9 | 110.8 | 94.3 | 5 |
| C2 | 26.6 | 112.2 | −116.6 | 13.5 | 117.4 | 85.6 | 5 |
| C3 | 27.0 | 107.7 | −149.8 | 30.2 | 152.8 | 80.7 | 5 |
| C4 | 26.7 | 109.4 | −123.8 | 17.3 | 125.0 | 82.7 | 5 |
| C5 | 21.6 | 80.0 | −134.8 | 29.5 | 138.0 | 58.4 | 5 |
| C6 | 17.7 | 59.2 | −116.3 | 27.3 | 119.5 | 41.5 | 4 |

Experiment results for Samples D1 to D6 will be described below with reference to Table 6. In this description, "highest" means highest among Samples D1 to D6, and "lowest" means lowest among Samples D1 to D6. As for the L* value of the shade, Sample D1 was highest at 24.5, and Sample D6 was lowest at 14.4. As for the L* value of the highlight, Sample D1 was highest at 92.2, and Sample D6 was lowest at 52.5. As for the ΔL* value, Sample D1 was highest at 67.7, and Sample D6 was lowest at 38.1. As for the a* value of the highlight, Sample D6 was highest at 31.7, and Sample D1 was lowest at −34.3. As for the b* value of the highlight, Sample D2 was highest at −86.7, and Sample D5 was lowest at −101.9. As for the C* value of the highlight, Sample D6 was highest at 105.5, and Sample D3 was lowest at 90.8. Samples D1 to D6 are each a decorative material that is recognized as a blue color in impression at first glance, but in Samples D1 to D6, the front face exhibits blue colors different from each other. In the sensory evaluation, Samples D1 to D4 other than Samples D5 and D6 were evaluated to be highest at "5". However, even Samples D5 and D6 were evaluated to be at "4".

TABLE 6

| SAMPLE (BLUE COLOR) | SHADE L* | HIGHLIGHT L* | a | b* | C* | ΔL* | SENSORY EVALUATION |
|---|---|---|---|---|---|---|---|
| D1 | 24.5 | 92.2 | −34.3 | −88.1 | 94.5 | 67.7 | 5 |
| D2 | 21.1 | 85.5 | −28.8 | −86.7 | 91.4 | 64.4 | 5 |
| D3 | 20.2 | 82.6 | −24.7 | −87.4 | 90.8 | 62.4 | 5 |
| D4 | 19.7 | 78.3 | −16.1 | −92.9 | 94.3 | 58.6 | 5 |
| D5 | 17.1 | 65.3 | 11.7 | −101.9 | 102.6 | 48.2 | 4 |
| D6 | 14.4 | 52.5 | 31.7 | −100.6 | 105.5 | 38.1 | 4 |

Conclusion

The inventor acquired knowledge as follows from Experiments 1 to 3.

(1) Saturation can be changed by adding, to the second cover layer 50, coloring pigment in an amount smaller than that in the first cover layer 40 per unit volume.

(2) The method of increasing and decreasing the content rate of the coloring pigment in the first cover layer 40 can be also employed to change the color of the front face of a decorative material in which the first cover layer 40 is covered by the third cover layer 60 that is colorless and transparent like Samples 2 to 5. However, with such a method, the a* value and the C* value starts decreasing at a predetermined content rate in the highlight when the coloring pigment in the first cover layer 40 is increased (refer "Samples 2 to 5" to in Table 2), and a color having desired redness and saturation cannot be achieved in some cases (refer to "Sample 2" in FIG. 3). However, the high a* value and the high C* value can be achieved by covering the first cover layer 40 with the second cover layer 50 containing 0.6 mass % of the coloring pigment (refer to "Sample 1" in Table 2). That is, with Sample 1 corresponding to the decorative material 10, it is possible to achieve high saturation at the front face while increasing the redness of the front face (refer to "Sample 1" in FIG. 3).

(3) The color depth is related with the ΔL* value. That is, irrespective of the color of the front face of the decorative material 10, the color depth tends to increase when the ΔL* value is high, and the color depth tends to decrease when the ΔL* value is low (refer to Tables 3 to 6). In the above-described sensory evaluation, the ΔL* value was 13.0 in Sample A5 evaluated to be at "2" (refer to Table 3), and the ΔL* value was 12.7 in Sample B6 evaluated to be at "2"

(refer to Table 4). In the above-described sensory evaluation, the ΔL* value was 5.3 in Sample A6 evaluated to be at "1" (refer to Table 3). However, in the above-described sensory evaluation, the ΔL* value was 20.2 in Sample A4 having the lowest ΔL* value among Samples A3, A4, and B5 evaluated to be at "3" (refer to Tables 3 and 4). Thus, the ΔL* value is preferably equal to or higher than 20. Accordingly, the color depth at the front face of the decorative material 10 is evaluated to be at "3" or higher in the above-described evaluation reference. Moreover, the ΔL* value is more preferably equal to or higher than 30. Accordingly, the color depth at the front face of the decorative material 10 is evaluated to be at "4" or higher in the above-described evaluation reference. Furthermore, the ΔL* value is still more preferably equal to or higher than 50. Accordingly, the color depth at the front face of the decorative material 10 is evaluated to be at "5" in the above-described evaluation reference. The color of the front face of the identical decorative material 10 changes depending on, for example, the angle at which the decorative material is viewed. It is possible to provide a color flop property to the decorative material 10.

Effects of Embodiment

According to the embodiment, it is possible to obtain effects as follows.

(1) The decorative material 10 includes the base material 30, the first cover layer 40, and the second cover layer 50 (refer to FIG. 1). The first cover layer 40 is laminated on the base material 30 and covers the base material 30. The first cover layer 40 is made of opaque synthesis resin. The second cover layer 50 is laminated on the first cover layer 40 and covers the first cover layer 40. The second cover layer 50 is made of chromatic and transparent synthesis resin. The first cover layer 40 contains the first coloring pigment and the bright pigment. The second cover layer 50 contains the second coloring pigment but contains no bright pigment. The first coloring pigment and the second coloring pigment have no luster, and the bright pigment has luster. In the decorative material 10, the second amount of the second coloring pigment contained in the second cover layer 50 per unit volume is smaller than the first amount of the first coloring pigment contained in the first cover layer 40 per unit volume. In the decorative material 10, the fourth amount of the second coloring pigment contained in the second cover layer 50 per unit area is smaller than the third amount of the first coloring pigment contained in the first cover layer 40 per unit area.

Thus, when the color of the first cover layer 40 remains same, the color of the entire front face of the decorative material 10 can be changed by changing the second amount of the second coloring pigment per unit volume (the content rate of the second coloring pigment) in the second cover layer 50 or by changing the fourth amount of the second coloring pigment per unit area in the second cover layer 50. In addition, when the color of the first cover layer 40 remains same, the color of the entire front face of the decorative material 10 can be changed by changing the material of the second coloring pigment in the second cover layer 50. High saturation can be achieved at the front face of the decorative material 10. Depth can be provided to the color of the front face of the decorative material 10 by covering the first cover layer 40 with the second cover layer 50 and setting the ΔL* value to be equal to or higher than 20. The decorative material 10 that can achieve increase of front face color variation can be obtained.

(2) In the second cover layer 50, the L* value in the L*a*b* color system of JIS Z 8781-4 is set to be higher than the L* value of the first cover layer 40. Thus, the first cover layer 40 can be visually recognized through the second cover layer 50 that is chromatic and transparent when the front face of the decorative material 10 is viewed from the first side (refer to FIG. 1) in the lamination direction. With the decorative material 10, it is possible to improve a sense of depth.

Modifications

The embodiment may be as follows. Some configurations among modifications described below may be employed in combination as appropriate. Any point different from the above description will be described below, and description of any identical point is omitted as appropriate.

(1) The decorative material 10 includes the bonding layer 20. The bonding layer 20 may be omitted. The first cover layer 40 is laminated on the base material 30 and firmly fixed to the base material 30 directly. The decorative material 10 may further include another cover layer. However, in the decorative material 10, the first cover layer 40 and the second cover layer 50 are preferably laminated in a state of being adjacent to each other. For example, the decorative material 10 may be provided with a cover layer made of colorless and transparent synthesis resin, which is similar to the third cover layer 60 described above. This cover layer is laminated on the second cover layer 50 and covers the second cover layer 50.

(2) The second cover layer 50 contains no bright pigment. Thus, unlike the first cover layer 40 containing the bright pigment, the second cover layer 50 does not have bright appearance due to the bright pigment. In the decorative material, bright pigment having luster may be contained in the second cover layer to provide bright appearance to the second cover layer. In this case, the second cover layer is made of chromatic and transparent synthesis resin containing the second coloring pigment and the bright pigment. In this description, the above-described bright pigment of the first cover layer 40 is referred to as "first bright pigment", and the bright pigment of the second cover layer is referred to as "second bright pigment". The second bright pigment may be bright pigment same as the first bright pigment or may be bright pigment different from the first bright pigment. The aforementioned different bright pigment includes, for example, bright pigment that is same in material but different in a property other than material, or bright pigment that is different in material but same in a property other than material. As the aforementioned properties other than material, the form of each bright pigment, such as powder form, piece from, or foil form, and the film thickness of a cover film formed on the surface of the bright pigment are exemplified.

When the content amount of the first bright pigment per unit volume (the content rate of the first bright pigment) or the content amount of the first bright pigment per unit area in the first cover layer 40 is a fifth amount, the content amount of the second bright pigment per unit volume (the content rate of the second bright pigment) or the content amount of the second bright pigment per unit area in the second cover layer may be a sixth amount smaller than the fifth amount. In the second cover layer, the sixth amount of the second bright pigment per unit volume or per unit area is set as appropriate with various conditions taken into account. In addition, in the second cover layer, the total content amount of the second coloring pigment and the second bright pigment per unit volume may be smaller than the above-described first amount, or the total content amount of the second coloring pigment and the second bright pigment per unit area may be smaller than the above-described third amount.

(3) In development of the decorative material 10, the inventor performed various studies including Experiments 1 to 3 described above. The inventor clarified, based on results obtained by these studies, the range of the fourth amount of the second coloring pigment per unit area in the second cover layer 50. Colors for which the fourth amount was clarified are a reddish color, a greenish color, and a bluish color, the a* value and the b* value of each of which in the L*a*b* color system are in ranges described below. The reddish color is recognized as a red color in impression at first glance. The greenish color is recognized as a green color in impression at first glance. The bluish color is recognized as a blue color in impression at first glance. Results obtained by this experiment are as follows.

Range of Fourth Amount

Reddish color (the a* value≥20, the b* value≥10): 0.1 to 0.75 g/m²

Greenish color (the a* value≤−20, −10 the b* value≤30): 0.1 to 3.77 g/m²

Bluish color (the b* value≤−30): 0.1 to 13.29 g/m²

The inventor thinks that, from viewpoints of the color depth and the saturation, each above-described range is preferable as the range of the fourth amount in the corresponding one of the above-described reddish color, greenish color, and bluish color.

In addition, the inventor obtained a result of 0.1 to 0.84 g/m² as the range of the fourth amount of the second coloring pigment per unit area in the second cover layer 50 in a yellowish color, the a* value and the b* value of which in the L*a*b* color system are in ranges as follows. The yellowish color is recognized as a yellow color in impression at first glance. The aforementioned ranges are "−30≤the a* value≤10" and "the b* value≥30". The inventor thinks that, from viewpoints of the color depth and the saturation, the aforementioned range is preferable as the range of the fourth amount in the aforementioned yellowish color.

DESCRIPTION OF REFERENCE SIGNS 10 decorative material
20 bonding layer
30 base material
40 first cover layer
50 second cover layer
60 third cover layer
S virtual straight line
T1, T2 thickness

The invention claimed is:

1. A decorative material comprising:
a base material;
a bonding layer;
a first cover layer that is laminated on the base material using the bonding layer, the bonding layer being positioned in between the first cover layer and the base material, and the first cover layer covering the base material and being made of opaque synthesis resin; and
a second cover layer that is laminated on the first cover layer, covers the first cover layer, and is made of chromatic and transparent synthesis resin, wherein
the first cover layer contains
a first coloring pigment having no luster, and
a bright pigment having luster, and
the second cover layer contains
a second coloring pigment having no luster, and
does not contain the bright pigment,
wherein, in the second cover layer, the difference between an L* value in an L*a*b* color system of JIS Z 8781-4 for light reflected toward a virtual straight line orthogonal to a front face of the decorative material by 15° from regular reflected light having a reflection angle of 45° with respect to the virtual straight line through reflection of light at the front face of the decorative material at an incident angle of 45° with respect to the virtual straight line and the L* value for light reflected toward the virtual straight line by 45° from the regular reflected light is set to be equal to or larger than 32.9.

2. The decorative material according to claim 1, wherein the first cover layer contains a first amount of the first coloring pigment per unit volume, and
the second cover layer contains a second amount of the second coloring pigment per unit volume, the second amount being smaller than the first amount.

3. The decorative material according to claim 1, wherein the first cover layer contains a third amount of the first coloring pigment per unit area, and
the second cover layer contains a fourth amount of the second coloring pigment per unit area, the fourth amount being smaller than the third amount.

4. The decorative material according to claim 1, wherein, in the second cover layer, an L* value in an L*a*b* color system of JIS Z 8781-4 is set to be higher than the L* value of the first cover layer.

5. The decorative material according to claim 2, wherein, in the second cover layer, an L* value in an L*a*b* color system of JIS Z 8781-4 is set to be higher than the L* value of the first cover layer.

6. The decorative material according to claim 3, wherein, in the second cover layer, an L* value in an L*a*b* color system of JIS Z 8781-4 is set to be higher than the L* value of the first cover layer.

* * * * *